US008981012B2

(12) United States Patent
Bowden et al.

(10) Patent No.: US 8,981,012 B2
(45) Date of Patent: Mar. 17, 2015

(54) MODIFIED POLYDICYCLOPENTADIENES

(75) Inventors: Ned B. Bowden, Iowa City, IA (US);
Mathew Perring, Iowa City, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 990 days.

(21) Appl. No.: 12/499,664

(22) Filed: Jul. 8, 2009

(65) Prior Publication Data
US 2010/0010185 A1    Jan. 14, 2010

Related U.S. Application Data

(60) Provisional application No. 61/079,335, filed on Jul. 9, 2008.

(51) Int. Cl.
| | | |
|---|---|---|
| C08F 132/06 | (2006.01) | |
| C08F 132/08 | (2006.01) | |
| C08F 8/20 | (2006.01) | |
| C08F 8/22 | (2006.01) | |
| C08F 8/32 | (2006.01) | |
| C08G 61/08 | (2006.01) | |
| B01J 20/26 | (2006.01) | |
| B01J 20/285 | (2006.01) | |
| B01D 15/38 | (2006.01) | |

(52) U.S. Cl.
CPC ............... *C08G 61/08* (2013.01); *B01J 20/261* (2013.01); *B01J 20/265* (2013.01); *B01J 20/267* (2013.01); *B01J 20/285* (2013.01); *B01D 15/3804* (2013.01)
USPC .................. 525/332.1; 525/332.3; 525/332.4; 525/343; 525/355; 525/356; 525/379; 525/383; 525/384; 526/282; 526/336

(58) Field of Classification Search
USPC ........ 525/332.1, 332.3, 332.4, 343, 355, 356, 525/379, 383, 384; 526/283, 336
See application file for complete search history.

(56) References Cited

U.S. PATENT DOCUMENTS

| 4,729,976 | A |   | 3/1988 | Sjardijn et al. | |
|---|---|---|---|---|---|
| 4,810,762 | A |   | 3/1989 | Sjardijn et al. | |
| 5,061,521 | A | * | 10/1991 | Endo et al. ..................... | 427/307 |
| 5,081,208 | A |   | 1/1992 | Sjardijn | |
| 5,093,433 | A | * | 3/1992 | Chung et al. ................... | 525/337 |
| 5,248,745 | A |   | 9/1993 | Sjardijn et al. | |
| 5,681,473 | A |   | 10/1997 | Miller et al. | |
| 5,683,356 | A |   | 11/1997 | Halperin et al. | |
| 5,691,432 | A | * | 11/1997 | Williams ....................... | 526/283 |
| 5,728,785 | A |   | 3/1998 | Grubbs et al. | |
| 5,895,800 | A | * | 4/1999 | Kataoka et al. ................ | 525/286 |
| 6,018,060 | A |   | 1/2000 | Baker et al. | |
| 6,433,101 | B1 | * | 8/2002 | Woodson et al. .......... | 525/332.1 |
| 7,084,222 | B2 | * | 8/2006 | Sakamoto et al. ............ | 526/171 |
| 7,084,284 | B2 |   | 8/2006 | Miller | |
| 8,227,635 | B2 |   | 7/2012 | Bowden et al. | |
| 2008/0023884 | A1 | * | 1/2008 | Konze et al. ................ | 264/328.1 |
| 2008/0132650 | A1 | * | 6/2008 | Patil .............................. | 525/360 |
| 2008/0142454 | A1 |   | 6/2008 | Emrick et al. | |
| 2008/0281090 | A1 |   | 11/2008 | Lee et al. | |

FOREIGN PATENT DOCUMENTS

WO    WO 2006/071470 A2    7/2006

OTHER PUBLICATIONS

Wikipedia article "Alkene"; http://en.wikipedia.org/wiki/Alkene; Jun. 2013.*
Wikipedia article "Amine"; http://web.archive.org/web/20071025225401/http://en.wikipedia.org/wiki/Amine; Oct. 2007.*
Bowden, N. B., Seminar at the University of Iowa, Iowa City, IA; 16 pages, Oct. 2007.*
Perring, M. and N. B. Bowden, "Assembly of organic monolayers on polydicyclopentadiene", *Langmuir*, 24(18), 10480-10487, (Sep. 16, 2008) (Epub Aug. 8, 2008).
Alberts et al., "Food and the Derivation of Cellular Energy", *Molecular Biology of the Cell*, 2nd Ed.,Garland Publishing, Inc., 64-69 (1989).
Asatekin et al., "Polymeric Nanopore Membranes for Hydrophobicity-Based Separations by Conformal Initiated Chemical Vapor Deposition", *Nano Lett.*, 11, 677-686 (2011).
Bellan et al., "Poly(dicyclopentadiene) Submicron Fibers Produced by Electrospinning", *Macromol. Rap. Comm.*, 27, 511-515 (2006).
Bowden, N. B., Seminar at the University of Iowa, Iowa City, IA, 16 pages, (Oct. 2007).
Bowden, N. B., "A Grignard reaction in water? New methods to carry out green cascade reactions using simple polymer thimbles", Department presentation at the University of Iowa, Iowa City, IA, 49 pages, (Nov. 2007).
Chen et al., "Metal—Organic Frameworks with Functional Pores for Recognition of Small Molecules", *Acc. Chem. Res.*, 43 (8), 1115-1124 (2010).
Dijkstra et al, "The Use of Ultra- and Nanofiltration Techniques in Homogeneous Catalyst Recycling", *Acc. Chem. Res.*, 35, 798-810 (2002).
Dijkstra et al., "A transport model for organophilic nanofiltration", *J. Mem. Sci.*, 286, 60-68 (2006).
Geens et al., "Removal of API's (Active Pharmaceutical Ingredients) from Organic Solvents by Nanofiltration", *Sep. Sci. Technol.*, 42, 2435-2449 (2007).
Gould et al., "Membrane Separation in Solvent 12-16 (2001). Lube Dewaxing", *Environ. Prog.*, 20, 12-16 (2001).
Gupta et al., "Retention of palladium and phosphine ligands using nanoporous polydicyclopentadiene thimbles", *Chem. Commun.*, 47, 10236-10238 (2011).
Hupp et al., "Liquid/Liquid Interface Polymerized Porphyrin Membranes Displaying Size-Selective Molecular and Ionic Permeability", *Langmuir*, 22, 1804-1809 (2006).

(Continued)

*Primary Examiner* — Roberto Rabago
(74) *Attorney, Agent, or Firm* — Viksnins Harris & Padys PLLP

(57) ABSTRACT

The present invention provides novel, modified polydicyclopentadienes and methods to prepare modified polydicyclopentadienes. The modified polydicyclopentadienes prepared by the methods of the invention are useful in many applications including new and useful solid phases for chromatography.

24 Claims, 1 Drawing Sheet

(56) References Cited

OTHER PUBLICATIONS

Jirage et al., "Nanotubule-based molecular-filtration membranes", Science, 278, 655-658 (1997).
Lee et al., "Thermal Analysis of Ring-Opening Metathesis Polymerized Healing Agents", *J. Polym. Sci., Part B: Polym. Phys*, 45, 1771-1780 (2007).
Liu et al., "Understanding gas separation in metal—organic frameworks using computer modeling", *J. Mater. Chem.* 20, 10308-10318 (2010).
Long et al., "Selective flux of organic liquids and solids using nanoprous membranes of polydicyclopentadiene", *J. Mater. Chem.*, 21, 14265-14276 (2011).
Martin et al., "Investigations of the Transport Properties of Gold Nanotubule Membranes", *J. Phys. Chem. B*, 105, 1925-1934 (2001).
Martina et al., "Macroporous Poly(dicyclopentadiene) Beads", *J. Appl. Polym. Sci.*, 96, 407-415 (2005).
Miller et al., "A Materials Approach to the Dual-Site Isolation of Catalysts Bonded to Linear Polymers and Small, Ionic Molecules for Use in One-Pot Cascade Reactions", *Advanced Materials*, 20(21), 4195-4199 and 7 pages of supporting information, (2008).
Miller et al., "Site-isolation and recycling of PdC12 using PDMS thimbles", *J. Org.Chem.*, 74(13), 4834-40 and 12 pages of supporting information, (2009).
Mueller et al., "Metal—organic frameworks—prospective industrial applications", *J. Mater. Chem. 16*, 626-636 (2006).
Muller et al., "Design and Evaluation of Inclusion Resolutions, Based on Readily Available Host Compounds", *Eur. J. Org. Chem.*, 1082-1096 (2005).
Mwangi, et al., "Occlusion of grubbs' catalysts in active membranes of polydimethylsiloxane: catalysis in water and new functional group selectivities", *J. Am. Chem. Soc.*, 128(45), 14434-14435 and 16 pages of supporting information, (2006).
Mwangi, M.T. and N. B. Bowden, "A new approach to cascade reactions using site-isolated catalysts and/or reagents", 8th International Symposium on Carbanion Chemistry (ISCC-8), University of Wisconsin, Madison, WI, 3 pages, (Jun. 6-10, 2007).
Mwangi et al., "'Pot-in-pot' reactions: Site isolation of organometallic catalysts and reagents for otherwise impossible cascade reactions", 42nd Midwest Regional ACS Meeting, Nov. 7-10, 2007, Kansas City, KS, 9 pages.
Mwangi et al., "A materials approach to site-isolation of Grubbs catalysts from incompatible solvents and m-chloroperoxybenzoic acid", *Chemistry: a European Journal*, 14(22), 6780-6788 and 20 pages of supporting information, (2008).
Mwangi et al., "Sequential Reactions with Grubbs Catalyst and AD-mix-α/β Using PDMS Thimbles", *Org. Lett.*, 11(1), 33-36 and 24 pages of supporting information, (2009).
Nair et al., "Extending Ru-BINAP Catalyst Life and Separating Products from Catalyst Using Membrane Recycling", *Org. Proc. Res. Dev.*, 13, 863-869 (2009).
Patterson et al., "Membrane selectivity in the organic solvent nanofiltration of trialkylamine bases", *Desalination*, 218, 248-256 (2008).
Peeva et al., In *Comprehensive membrane science and engineering*;Drioli, E., Giorno, L., Eds.; Elsevier: Boston, 2010, vol. 2 p. 91-111.

Peplow, M., "'Pot-in-a-pot' technique makes impossible cascade reactions easy", *Chemistry World*, 2 pages, (Apr. 10, 2008).
Perring et al., "Epoxidation of the surface of polydicyclopentadiene for the self-assembly of organic monolayers", *J. Mater. Chem.*, 20, 8679-8685 (2010).
Phillip et al., "Diffusion and Flow Across Nanoporous Polydicyclopentadiene-Based Membranes", *ACS, Applied Materials & Interfaces*, vol. 1, No. 2, 472-480 (2009).
Pink et al., "Organic Solvent Nanofiltration and Adsorbents; A Hybrid Approach to Achieve Ultra Low Palladium Contamination of Post Coupling Reaction Products", *Org. Proc. Res. Dev.*, 12, 589-595 (2008).
Rule et al., "ROMP Reactivity of endo- and exo-Dicyclopentadiene", *Macromolecules*, 35, 7878-7882 (2002).
Runge, et al., "New selectivities from old catalysts. Occlusion of Grubbs' catalysts in PDMS to change their reactions", *J. Organomet. Chem.*, 691 5278-5288, (2006).
Runge et al., "Cascade Reactions Using LiA1H4 Presence of Water", *Angew. Chem. Int. Ed.*, 47, 935-939 and Grignard Reagents in the and 16 pages of supporting information, (2008).
Schmidt et al, "Application of Process Moedelling Tools in the Scale-Up of Pharmaceutical Crystallisation Processes", *Org. Process Res. Dev.*, 8, 998-1008 (2004).
See-Toh et al., "In search of a standard method for the characterization of organic solvent nanofiltration membranes", *J. Mem. Sci.*, 291, 120-125 (2007).
See-Toh et al., "Polymeric membranes for nanofiltration in polar aprotic solvents", *Journal of Membrane Science*, 301, 3-10 (2007).
See-Toh et al., "Controlling molecular weight cut-off curves for highly solvent stable organic solvent nanofiltration (OSN) membranes", *J. Mem. Sci.*, 324, 220-232 (2008).
Silva et al., "Nanofiltration in Organic Solvents", *Adv. Membr. Technol. Appl.*, 451-467 (2008).
Snurr et al., "Prospects for Nanoporous Metal-Organic Materials in Advanced Separations Processes", *AIChE Journal*, 50 (6), 1090-1095 (2004).
Thomas, "Adsorption and desorption of hydrogen on metal—organic framework materials for storage applications: comparison with other nanoporous materials", *Dalton Tran.*, 1487-1505 (2009).
Vandezande et al., "Solvent resistant nanofiltration: separating on a molecular level", *Chem. Soc. Rev.*, 37, 365-405 (2008).
Wikipedia, http://en.wikipedia.org/wiki/Citric.sub.--acid.sub.--cycle , 8 pages (2011).
Wikipedia, http://en.wikipedia.org/wiki/Isocitrate.sub.--dehydrogenase, 10 pages (2011).
Wikipedia, http://en.wikipedia.org/wiki/Pyruvate.sub.--dehydrogenase, 6 pages (2011).
Wirtz et al., "Molecular Sieving and Sensing with Gold Nanotube Membranes", *Chem. Rec.*, 2, 259-267 (2002).
Zhao et al., "Tuning the Topology and Functionality of Metal—Organic Frameworks by Ligand Design", *Acc. Chem. Res.*, 44 (2), 123-133 (2011).
Zou et al., "Storage and separation applications of nanoporous metal—organic grameworks", *CrystEngComm*, 12, 1337-1353 (2010).

* cited by examiner

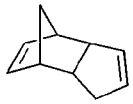

Dicyclopentadiene

Process step

Step 1. ROMP polymerization of dicyclopentadiene to produce starting polydicyclopentadiene

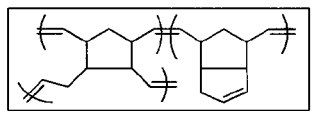

Starting polydicyclopentadiene first reagent 

Step 2. Reaction of starting polydicyclopentadiene with first reagent to produce first modified polydicyclopentadiene

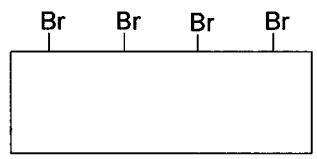

First modified polydicyclopentadiene second reagent 

Step 3. Reaction of first modified polydicyclopentadiene with second reagent to produce second modifed polydicyclo-pentadiene

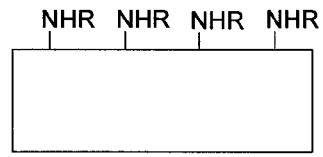

Second modified polydicyclopentadiene

MODIFIED POLYDICYCLOPENTADIENES

PRIORITY OF INVENTION

This application claims priority under 35 U.S.C. §119(e) from U.S. Provisional Application No. 61/079,335, filed Jul. 9, 2008 which application is hereby incorporated by reference herein.

BACKGROUND OF THE INVENTION

Control over surface chemistry on organic and inorganic substrates is critically important in many industrial devices. Surface chemistry is typically controlled either by assembling organic monolayers such as thiols on gold or siloxanes on glass, or through the assembly or growth of polymers on surfaces. One set of examples to illustrate the importance of surface chemistry is the use of DNA and protein arrays in medicine and biology. These arrays require complex patterns of single-stranded DNA or proteins bonded to a surface with high loadings. In these arrays and other materials, the surface chemistry must be well defined and controlled such that the functional groups exposed on a surface are known and react with selected molecules. Because of the importance of well-defined surface chemistry in areas as diverse as chromatography, DNA arrays, biosensors, tribology and others, developing new surface-modified materials and methods to control surface chemistry is a very active area of research.

Currently there is a need for new polymeric materials for which the surface chemistry is well-defined. Coupled to this need for new materials is the need for new methods that allow for the synthesis of well-defined surfaces on polymeric substrates.

SUMMARY OF THE INVENTION

The present invention provides novel, modified polydicyclopentadienes. Accordingly, in one embodiment the invention provides a modified polydicyclopentadiene comprising a starting polydicyclopentadiene having a plurality of double bonds wherein a reactant group has been added to at least about 2% of the double bond carbons of the starting polydicyclopentadiene.

The invention also provides a method to prepare a first modified polydicyclopentadiene. Accordingly, in one embodiment the invention provides a method for preparing a first modified polydicyclopentadiene comprising contacting a starting polydicyclopentadiene having a plurality of double bonds with a first reagent that adds a first reactant group to at least about 2% of the double bond carbons of the starting polydicyclopentadiene to provide the first modified polydicyclopentadiene.

The invention also provides a method to chemically modify the first modified polydicyclopentadiene to produce a second modified polydicyclopentadiene. Accordingly, in one embodiment the invention provides a method for preparing a second modified polydicyclopentadiene comprising contacting the first modified polydicyclopentadiene with a second reagent to add a second reactant group to the first modified polydicyclopentadiene to provide a second modified polydicyclopentadiene.

The invention also provides a first modified polydicyclopentadiene and a second modified polydicyclopentadiene prepared by a method of the invention.

The modified polydicyclopentadienes of the invention, including the first and second modified polydicyclopentadienes prepared by methods of the invention, are useful for a variety of applications. One application is in separation sciences, particularly as novel solid phases for chromatography useful in the separation of organic compounds and biomolecules such as polypeptides and proteins. Polymers of the invention wherein molecules such polynucleotides are covalently bound to the modified polydicyclopentadienes are useful in preparation of DNA arrays and DNA chips. Polymers of the invention are also useful in the preparation of arrays wherein molecules that probe for the presence of distinct cells, proteins, DNA sequences, metals, or small organic molecules are bonded to the modified polydicyclopentadiene. Methods of the invention are useful in the preparation of novel materials wherein polymers, metals, or coatings (such as paint, aluminum, steel, or other materials that can form a coating or solid support) are bonded to the polydicyclopentadiene. The polymers of the invention can also be used on the interior of nano- or microfluidic channels to provide surfaces upon which other molecules may bind.

The invention also provides a device (e.g. a chromatography media, a stamp, a DNA chip, or an RNA chip, etc.) comprising a modified polydicyclopentadiene of the invention. In one embodiment, the device comprises a layer of the modified polydicyclopentadiene. In another embodiment, the device comprises a monolayer of the modified polydicyclopentadiene. The invention also provides a device comprising one or more surfaces, wherein one or more of the surfaces comprises a modified polydicyclopentadiene of the invention comprising a preselected pattern.

BRIEF DESCRIPTION OF THE FIGURES

FIG. 1 illustrates one method of preparing modified polydicyclopentadienes of the invention including first modified polydicyclopentadienes and second modified polydicyclopentadienes.

DETAILED DESCRIPTION

The following definitions are used, unless otherwise described: halo is fluoro, chloro, bromo, or iodo. Alkyl, alkoxy, alkenyl, alkynyl, alkanoyl, alkanoyloxy, alkoxycarbonyl etc. denote both straight and branched groups; but reference to an individual radical such as propyl embraces only the straight chain radical, a branched chain isomer such as isopropyl being specifically referred to. Aryl denotes a phenyl radical or an ortho-fused bicyclic carbocyclic radical having about nine to ten ring atoms in which at least one ring is aromatic.

Specific values listed below for radicals, substituents, and ranges, are for illustration only; they do not exclude other defined values or other values within defined ranges for the radicals and substituent.

Specifically, (C1-C10)alkyl can be methyl, ethyl, propyl, isoproproyl, butyl, isobutyl, tertbutyl, pentyl, 3-pentyl, 2,2-dimethylprop-1-yl, hexyl, heptyl, octyl, nonyl, or decyl, etc.; (C2-C10)alkenyl can be vinyl, allyl, 1-propenyl, 2-propenyl, 1-butenyl, 2-butenyl, 3-butenyl, 1,-pentenyl, 2-pentenyl, 3-pentenyl, 4-pentenyl, 1-hexenyl, 2-hexenyl, 3-hexenyl, 4-hexenyl, or 5-hexenyl, etc.; (C2-C10)alkynyl can be ethynyl, 1-propynyl, 2-propynyl, 1-butynyl, 2-butynyl, 3-butynyl, 1-pentynyl, 2-pentynyl, 3-pentynyl, 4-pentynyl, 1-hexynyl, 2-hexynyl, 3-hexynyl, 4-hexynyl, or 5-hexynyl, etc.; (C1-C10)alkanoyl can be acetyl, propanoyl, butanoyl, hexanoyl, heptanoyl or octanoyl, etc.; (C1-C10)alkoxy can be methoxy, ethoxy, propoxy, isopropoxy, butoxy, pentoxy, or hexyloxy, or heptyloxy; (C1-C10)alkanoyloxy can be acetoxy, propanoyloxy, butanoyloxy, isobutanoyloxy, tertbutanoyloxy, pentanoyloxy, or hexanoyloxy, etc.; (C1-C10)alkoxycarbonyl can be methoxycarbonyl, ethoxycarbonyl, propoxycarbonyl, isopropoxycarbonyl, butoxycarbonyl, pentoxycarbonyl, or hexyloxycarbonyl etc.; and aryl can be phenyl, indenyl, or naphthyl;

The term "amino acid," comprises the residues of the natural amino acids (e.g. Ala, Arg, Asn, Asp, Cys, Glu, Gln, Gly, His, Hyl, Hyp, Ile, Leu, Lys, Met, Phe, Pro, Ser, Thr, Trp, Tyr, and Val) in D or L form, as well as unnatural amino acids (e.g. phosphoserine, phosphothreonine, phosphotyrosine, hydroxyproline, gamma-carboxyglutamate; hippuric acid, octahydroindole-2-carboxylic acid, statine, 1,2,3,4,-tetrahydroisoquinoline-3-carboxylic acid, penicillamine, ornithine, citruline, α-methyl-alanine, para-benzoylphenylalanine, phenylglycine, propargylglycine, sarcosine, and tert-butylglycine). The term also comprises natural and unnatural amino acids bearing a conventional amino protecting group (e.g. acetyl or benzyloxycarbonyl), as well as natural and unnatural amino acids protected at the carboxy terminus (e.g. as a $(C1-C_6)$alkyl, phenyl or benzyl ester or amide; or as an α-methylbenzyl amide). Other suitable amino and carboxy protecting groups are known to those skilled in the art (See for example, T. W. Greene, *Protecting Groups In Organic Synthesis*; Wiley: New York, 1981, and references cited therein). An amino acid can be linked to the modified polydicyclopentadiene through the carboxy terminus, the amino terminus, or through any other convenient point of attachment, such as, for example, through the sulfur of cysteine or the hydroxy of serine.

The term saccharide includes monosaccharides, disaccharides, trisaccharides and polysaccharides. The term includes glucose, sucrose fructose and ribose, as well as deoxy sugars such as deoxyribose and the like. Saccharide derivatives can conveniently be prepared as described in International Patent Applications Publication Numbers WO 96/34005 and 97/03995. A saccharide can conveniently be linked to the modified polydicyclopentadiene through any convenient point of attachment, such as, for example, an ether bond.

The term "peptide" describes a sequence of about 2 to 25 amino acids (e.g. as defined hereinabove) or peptidyl residues. The sequence may be linear or cyclic. For example, a cyclic peptide can be prepared or may result from the formation of disulfide bridges between two cysteine residues in a sequence. A peptide can be linked to the modified polydicyclopentadiene through the carboxy terminus, the amino terminus, or through any other convenient point of attachment, such as, for example, through the sulfur of a cysteine or the hydroxy of serine. Peptide derivatives can be prepared as disclosed in U.S. Pat. Nos. 4,612,302; 4,853,371; and 4,684,620. Peptide sequences specifically recited herein are written with the amino terminus on the left and the carboxy terminus on the right.

As used herein, the terms "nucleic acid" and "polynucleotide" refer to deoxyribonucleotides or ribonucleotides and polymers thereof in either single- or double-stranded form, composed of monomers (nucleotides) containing a sugar, phosphate and a base that is either a purine or pyrimidine. Unless specifically limited, the term encompasses nucleic acids containing known analogs of natural nucleotides which have similar binding properties as the reference nucleic acid. A nucleic acid or polynucleotide can conveniently be bonded to the modified polydicyclopentadiene through any convenient point of attachment of the nucleic acid or polynucleotide. The nucleic acid or polynucleotide can also be bound to the modified polydicyclopentadiene through an appropriate linker such as a linker used in the production of DNA chips or DNA arrays.

It will be appreciated by those skilled in the art that some modified polydicyclopentadienes of the invention may include one or more chiral centers, which may be in enantiomerically enriched or racemic forms.

A method for preparing specific modified polydicyclopentadienes of the invention is depicted in FIG. 1. In one embodiment of the invention the starting polydicyclopentadiene can be prepared by ring opening metathesis polymerization of dicyclopentadiene. The starting polydicyclopentadiene is then allowed to react with a first reagent (e.g. bromine), which adds a first reactant (bromo) to the double bonds that reside near the surface of the starting polydicyclopentadiene to provide the first modified polydicyclopentadiene. The first modified polydicyclopentadiene is then optionally allowed to react with a second reagent (e.g. an amine) that results in the displacement of some of the first reactant (bromo) with the second reactant (amine) to produce the second modified polydicyclopentadiene.

Starting Polydicyclopentadiene

Starting polydicyclopentadiene as used in the invention is the starting material which is utilized to prepare the first modified polydicyclopentadiene of the invention. Polydicyclopentadiene generally can be prepared by two different methods. One method is based upon radical polymerization of dicyclopentadiene. This method provides a polydicyclopentadiene that is highly cross-linked with a low concentration of olefins in the final polymer.

A second method to prepare polydicyclopentadiene is based upon ring opening metathesis polymerization (ROMP) of dicyclopentadiene. The ring opening metathesis polymerization process results in a highly cross-linked material with olefins present at high concentrations within the polydicyclopentadiene (i.e. four $sp^2$ hybridized carbons for every ten carbons in the polymer). This high concentration of olefinic carbons renders the starting polydicyclopentadiene produced by ring opening metathesis polymerization particularly useful as a starting material for the present invention.

Ring opening metathesis polymerization (ROMP) of dicyclopentadiene generally comprises contacting dicyclopentadiene (the monomer) with a catalyst in the presence or absence of solvent. One particularly type of useful catalyst is a soluble catalyst. A soluble catalyst is a catalyst that is soluble in a solution of monomer (dicyclopentadiene) and an optional solvent at the beginning of the polymerization reaction. Examples of catalysts useful for ring opening metathesis polymerization of dicyclopentadiene include 1-3-bis-(2,4,6-trimethylphenyl)-2-imidazolidinylidene)-dichloro(phenylmethylene)-(tricyclohexylphosphine)ruthenium (Grubbs Catalyst 2nd Generation) and benzylidene-bis(tricyclohexylphosphine)dichlororuthenium (Grubbs Catalyst 1st Generation). The ring opening polymerization can be conducted over a wide temperature range. Such a range would include but not be limited to temperatures from about 0° C. to about 100° C., more specifically, a range of about 25° C. to about 65° C. Ring opening metathesis polymerization of dicyclopentadiene can be conducted in the presence or absence of a solvent. For example, suitable solvents include but are not limited to halogenated solvents such as dichloromethane, dichloroethane, hydrocarbon solvents (linear and branched chained alkanes and alkenes) such as hexane and heptane and aromatic solvents such as benzene, toluene and xylenes. The polymerization reaction can be conducted over a wide range of dicyclopentadiene (monomer) to catalyst ratios such as about 1000 to 1, 10,000 to 1, 20,000 to 1, 30,000 to 1 and about 100,000 to 1.

First Modified Polydicyclopentadiene

A first modified polydicyclopentadiene is a starting polydicyclopentadiene that has been chemically modified to produce the first modified polydicyclopentadiene. The properties of the first modified polydicyclopentadiene make it useful for a variety of applications as mentioned hereinabove. The first modified polydicyclopentadiene is also especially useful as an intermediate for further chemical manipulation to produce a second modified polydicyclopentadiene. The first modified polydicyclopentadiene is prepared, for example, by contacting the starting polydicyclopentadiene with a first reagent in the presence of any necessary solvents, catalysts and/or co-reagents and the like. The first reagent is most typically selected so that the reagent will react with carbon-carbon double bonds and in particular the carbon-carbon double bonds of the starting polydicyclopentadiene. The product of this reaction (the first modified polydicyclopentadiene) is often the addition of a first reactant to the double bond carbons of the starting polydicyclopentadiene. Typically, the first reactant group comprises the whole or alternatively a residue of the first reagent. By way of example the first reagents include but are not limited to bimolecular halogens (e.g. $Br_2$, $Cl_2$, $I_2$), mineral acids (e.g. HCl, HBr) or water. Examples of first reactants include but are limited to halo (e.g. bromo, chloro, iodo) and hydroxyl.

In one embodiment the first reagent will add a reactant group to each double bond carbon for each double bond of the starting dicyclopentadiene for which the first reagent reacts. In another embodiment the first reagent will add the same reactant group to each double bond carbon for each double bond of the starting dicyclopentadiene for which the first reagent reacts. In another embodiment the first reagent will add a reactant group to one double bond carbon for each double bond of the starting dicyclopentadiene for which the first reagent reacts.

In one embodiment the invention provides a method for preparing a first modified polydicyclopentadiene comprising contacting a starting polydicyclopentadiene having a plurality of double bonds with a first reagent that adds a first reactant group to at least about 2% of the double bond carbons of the starting polydicyclopentadiene to provide the first modified polydicyclopentadiene. In another embodiment the first reagent adds the first reactant group to at least about 5% of the double bond carbons of the starting polydicyclopentadiene. In another embodiment the first reagent adds the first reactant group to at least about 10% of the double bond carbons of the starting polydicyclopentadiene. In another embodiment the first reagent adds the first reactant group to at least about 20% of the double bond carbons of the starting polydicyclopentadiene. In another embodiment the first reagent adds the first reactant group to at least about 30% of the double bond carbons of the starting polydicyclopentadiene. In another embodiment the first reagent adds the first reactant group to at least about 50% of the double bond carbons of the starting polydicyclopentadiene. In another embodiment the first reagent adds the first reactant group to at least about 70% of the double bond carbons of the starting polydicyclopentadiene. In another embodiment the first reagent adds the first reactant group to at least about 90% of the double bond carbons of the starting polydicyclopentadiene.

In one embodiment the first reagent adds a first reactant group to each double bond carbon of about 5-70% of the double bonds of the starting polydicyclopentadiene. In another embodiment the first reagent adds a first reactant group to each double bond carbon of about 5-60% of the double bonds of the starting polydicyclopentadiene. In another embodiment the first reagent adds a first reactant group to each double bond carbon of about 5-50% of the double bonds of the starting polydicyclopentadiene. In another embodiment the first reagent adds a first reactant group to each double bond carbon of about 5-40% of the double bonds of the starting polydicyclopentadiene. In another embodiment the first reagent adds a first reactant group to each double bond carbon of about 5-30% of the double bonds of the starting polydicyclopentadiene.

In one embodiment the first reagent is selected from bimolecular halogen (e.g. $Cl_2$, $Br_2$ or $I_2$). In another embodiment the first reagent is $Br_2$.

In one embodiment the first reactant group is selected from halo. In another embodiment the first reactant group is bromo.

Second Modified Polydicyclopentadiene

A second modified polydicyclopentadiene includes a first modified polydicyclopentadiene that has been chemically modified to create a novel material. In addition to the uses described hereinabove, the second modified polydicyclopentadienes may also be used as an intermediate for further chemical modification to produce a modified polydicyclopentadiene.

The second modified polydicyclopentadiene is typically prepared, for example, by contacting the first modified polydicyclopentadiene with a second reagent in the presence of any necessary solvents catalysts and/or co-reagents and the like to produce the second modified polydicyclopentadiene. The second reagent is selected so that the reagent will react with the first modified polydicyclopentadiene so as to chemically alter the first modified polydicyclopentadiene. By way of example the second reagents include but are not limited to any compound comprising one or more amine, alcohol or thiol functional groups provided that at least one of functional groups (e.g. amine, alcohol or thiol) is capable of reacting with the first modified polydicyclopentadiene. In one embodiment the second reagent adds a second reactant group to the first modified polydicyclopentadiene. In another embodiment the second reagent reacts with the first modified polydicyclopentadiene resulting in the displacement of the first reactant group with the second reactant group. Typically, the second reactant group comprises the whole or alternatively a residue of the second reagent.

In one embodiment the invention provides a method for preparing a second modified polydicyclopentadiene comprising contacting the first modified polydicyclopentadiene with a second reagent to add a second reactant group to the first modified polydicyclopentadiene to provide a second modified polydicyclopentadiene. In another embodiment the second reactant group displaces at least about 2% of the first reactant groups of the first modified polydicyclopentadiene to provide the second modified polydicyclopentadiene. In another embodiment the second reactant group displaces at least about 5% of the first reactant groups of the first modified polydicyclopentadiene to provide the second modified polydicyclopentadiene. In another embodiment the second reactant group displaces at least about 10% of the first reactant groups of the first modified polydicyclopentadiene to provide the second modified polydicyclopentadiene. In another embodiment the second reactant group displaces at least about 20% of the first reactant groups of the first modified polydicyclopentadiene to provide the second modified polydicyclopentadiene. In another embodiment the second reactant group displaces at least about 30% of the first reactant groups of the first modified polydicyclopentadiene to provide of the second modified polydicyclopentadiene. In another embodiment the second reactant group displaces at least about 50% of the first reactant groups of the first modified polydicyclopentadiene to provide the second modified polydicyclopentadiene. In another embodiment the second reactant group displaces at least about 70% of the first reactant groups of the first modified polydicyclopentadiene to provide the second modified polydicyclopentadiene. In another embodiment the second reactant group displaces at least about 90% of the first reactant groups of the first modified polydicyclopentadiene to provide the second modified polydicyclopentadiene.

In one embodiment each second reactant group is independently selected from —NR$_a$R$_b$, —OR$_c$, —SR$_c$, an amino acid residue, a peptide residue, a nucleic acid residue, a polynucleotide residue and a saccharide residue;

wherein each R$_a$, R$_b$ and R$_c$ is independently H, (C1-10)alkyl, (C2-10)alkenyl, (C2-10)alkynyl, (C1-10)alkanoyl, (C1-10)alkoxy, (C1-10)alkanoyloxy, aryl or (C1-10)alkoxycarbonyl, which (C1-10)alkyl, (C2-10)alkenyl, (C2-10)alkynyl, (C1-10)alkanoyl, (C1-10)alkoxy, (C1-10)alkanoyloxy or (C1-10)alkoxycarbonyl, is optionally substituted with one or more (e.g. 1, 2, 3, 4, 5 or more than 5) aryl, halo, hydroxy, carboxy, cyano, (C1-10)alkoxy or N(CH$_2$CH$_2$NH$_2$)$_2$ which aryl is optionally substituted with one or more (e.g. 1, 2, 3, 4 or 5) halo, hydroxyl, carboxy, cyano and trifluoromethyl;

or R$_a$ and R$_b$ together with the nitrogen to which they are attached form a pyrrolidine, piperidine, piperazine, morpholino, or thiomorpholino ring; which ring is optionally substituted with one or more (C1-10)alkyl or (C1-10)alkoxy, and which (C1-10)alkyl or (C1-10)alkoxy is optionally substituted with one or more (e.g. 1, 2, 3, 4, 5 or more than 5) halo.

In one embodiment each second reactant group is independently selected from NR$_a$R$_b$ wherein each R$_a$ and R$_b$ is independently H, (C1-10)alkyl, (C2-10)alkenyl, (C2-10)alkynyl, (C1-10)alkanoyl, (C1-10)alkoxy, (C1-10)alkanoyloxy, aryl or (C1-10)alkoxycarbonyl, which (C1-10)alkyl, (C2-10)alkenyl, (C2-10)alkynyl, (C1-10)alkanoyl, (C1-10)alkoxy, (C1-10)alkanoyloxy, or (C1-10)alkoxycarbonyl, is optionally substituted with one or more (e.g. 1, 2, 3, 4, 5 or more than 5) aryl, halo, hydroxy, carboxy, cyano, (C1-10)alkoxy or N(CH$_2$CH$_2$NH$_2$)$_2$ which aryl is optionally substituted with one or more (e.g. 1, 2, 3, 4 or 5) halo, hydroxyl, carboxy, cyano and trifluoromethyl; or R$_a$ and R$_b$ together with the nitrogen to which they are attached form a pyrrolidine, piperidine, piperazine, morpholino, or thiomorpholino ring; which ring is optionally substituted with one or more (e.g. 1, 2, 3, 4 or 5) (C1-10)alkyl or (C1-10)alkoxy, and which (C1-10)alkyl or (C1-10)alkoxy is optionally substituted with one or more (e.g. 1, 2, 3, 4, 5 or more than 5) halo. In another embodiment each second reactant group is independently selected from 4-(trifluoromethyl)benzylamine and tris(2-aminoethyl)amine.

Modified Polydicyclopentadiene

A modified polydicyclopentadiene includes the polymers discussed hereinabove as the first modified polydicyclopentadiene and the second modified polydicyclopentadiene. Therefore, in one embodiment the invention provides for a modified polydicyclopentadiene comprising a starting polydicyclopentadiene having a plurality of double bonds wherein a reactant group has been added to at least about 2% of the double bond carbons of the starting polydicyclopentadiene.

In another embodiment each reactant group is independently selected from halo, —NR$_a$R$_b$, —OR$_c$, —SR$_c$, an amino acid residue, a peptide residue, a nucleic acid residue, a polynucleotide residue and a saccharide residue;

wherein each R$_a$, R$_b$ and R$_c$ is independently H, (C1-10)alkyl, (C2-10)alkenyl, (C2-10)alkynyl, (C1-10)alkanoyl, (C1-10)alkoxy, (C1-10)alkanoyloxy, aryl or (C1-10)alkoxycarbonyl, which (C1-10)alkyl, (C2-10)alkenyl, (C2-10)alkynyl, (C1-10)alkanoyl, (C1-10)alkoxy, (C1-10)alkanoyloxy, (C1-10)alkoxy, (C1-10)alkanoyloxy or (C1-10)alkoxycarbonyl, is optionally substituted with one or more (e.g. 1, 2, 3, 4, 5 or more than 5) aryl, halo, hydroxy, carboxy, cyano, (C1-10)alkoxy or N(CH$_2$CH$_2$NH$_2$)$_2$ which aryl is optionally substituted with one or more (e.g. 1, 2, 3, 4 or 5) halo, hydroxyl, carboxy, cyano and trifluoromethyl;

or R$_a$ and R$_b$ together with the nitrogen to which they are attached form a pyrrolidine, piperidine, piperazine, morpholino, or thiomorpholino ring; which ring is optionally substituted with one or more (e.g. 1, 2, 3, 4 or 5) (C1-10)alkyl or (C1-10)alkoxy, and which (C1-10)alkyl or (C1-10)alkoxy is optionally substituted with one or more (e.g. 1, 2, 3, 4, 5 or more than 5) halo.

In another embodiment each reactant group is independently selected form halo and NR$_a$R$_b$ wherein each R$_a$ and R$_b$ is independently H, (C1-10)alkyl, (C2-10)alkenyl, (C2-10)alkynyl, (C1-10)alkanoyl, (C1-10)alkoxy, (C1-10)alkanoyloxy, aryl or (C1-10)alkoxycarbonyl, which (C1-10)alkyl, (C2-10)alkenyl, (C2-10)alkynyl, (C1-10)alkanoyl, (C1-10)alkoxy, (C1-10)alkanoyloxy, or (C1-10)alkoxycarbonyl, is optionally substituted with one or more (e.g. 1, 2, 3, 4, 5 or more than 5) aryl, halo, hydroxy, carboxy, cyano, (C1-10)alkoxy or N(CH$_2$CH$_2$NH$_2$)$_2$ which aryl is optionally substituted with one or more (e.g. 1, 2, 3, 4 or 5) halo, hydroxyl, carboxy, cyano and trifluoromethyl; or R$_a$ and R$_b$ together with the nitrogen to which they are attached form a pyrrolidine, piperidine, piperazine, morpholino, or thiomorpholino ring; which ring is optionally substituted with one or more (e.g. 1, 2, 3, 4 or 5) (C1-10)alkyl or (C1-10)alkoxy, and which (C1-10)alkyl or (C1-10)alkoxy is optionally substituted with one or more (e.g. 1, 2, 3, 4, 5 or more than 5) halo.

In another embodiment each reactant group is independently selected from halo. In another embodiment each reactant group is bromo. In another embodiment each reactant group is independently selected from bromo, 4-(trifluoromethyl)benzylamine and tris(2-aminoethyl)amine. In another embodiment each reactant group is independently selected from bromo and 4-(trifluoromethyl)benzylamine. In another embodiment each reactant group is independently selected from bromo and tris(2-aminoethyl)amine.

In one embodiment the reactant group has been added to at least about 5% of the double bond carbons of the starting polydicyclopentadiene. In another embodiment the reactant group has been added to at least about 10% of the double bond carbons of the starting polydicyclopentadiene. In another embodiment the reactant group has been added to at least about 20% of the double bond carbons of the starting polydicyclopentadiene. In another embodiment the reactant group has been added to at least about 30% of the double bond carbons of the starting polydicyclopentadiene. In another embodiment the reactant group has been added to at least about 50% of the double bond carbons of the starting polydicyclopentadiene. In another embodiment the reactant group has been added to at least about 70% of the double bond carbons of the starting polydicyclopentadiene. In another embodiment the reactant group has been added to at least about 90% of the double bond carbons of the starting polydicyclopentadiene.

Patterning of Modified Polydicyclopentadienes

Another aspect of the invention includes formation of the modified polydicyclopentadienes as preselected patterns on the starting polydicyclopentadiene. This invention includes formation of the first modified polydicyclopentadiene on the starting polydicyclopentadiene as a preselected pattern as well as formation of the second modified polydicyclopentadiene on the first modified polydicyclopentadiene as a preselected pattern. One method to form patterned modified polydicyclopentadienes utilizes polydimethylsiloxane slabs common in soft lithography (Whitesides, G. M.; Ostuni, E.; Takayama, S.; Jiang, X.; Ingber, D. E. *Ann. Rev. Biomed. Eng.* 2001, 3, 335-373.; Kane, R. S.; Strock, A. D.; Jeon, N. L.; Ingber, D. E.; Whitesides, G. M. *Opt. Biosens.* 2002, 571-595.; Kane, R. S.; Takayama, S.; Ostuni, E.; Ingber, D. E.; Whitesides, G. M. *Biomaterials* 1999, 20, 2363-2376.; Bruinink, C. M.; Peter, M.; de Boer, M.; Kuipers, L.; Huskens, J.; Reinhoudt, D. N. *Adv. Mater.* 2004, 16, 1086-1090.; Huang, Y.; Paloczi, G. T.; Yariv, A.; Zhang, C.; Dalton, L. R. *J. Phys. Chem. B* 2004, 108, 8606-8613.; McDonald, J. C.; Duffy, D. C.; Anderson, J. R.; Chiu, D. T.; Wu, H.; Schueller, O. J.; Whitesides, G. M. *Electrophoresis* 2000, 21, 27-40.; Rolland, J.; Hagberg, E. C.; Dension, G. M.; Carter, K. R.; De Simone, J. M. *Angew. Chem. Int. Ed.* 2004, 43, 5796-5799.; Rolland, J. P.; Zhou, Z.; Kelly, J. Y.; Denison, G. M.; van Dam, R. M.; Hagberg, E. C.; Carter, K. R.; Quake, S. R.; DeSimone, J. M. *Polym. Mat.: Sci. Eng.* 2004, 91, 254-255.)

In one embodiment the modified polydicyclopentadiene is prepared as a preselected pattern on the starting polydicyclopentadiene. In another embodiment the first modified polydicyclopentadiene is prepared as a preselected pattern on the starting polydicyclopentadiene. In another embodiment the second modified polydicyclopentadiene is prepared as a preselected pattern on the first modified polydicyclopentadiene. In another embodiment the modified polydicyclopentadiene is prepared as a preselected pattern on the starting polydicyclopentadiene using any of the techniques of soft lithography. In another embodiment the first modified polydicyclopentadiene is prepared as a preselected pattern on the starting polydicyclopentadiene using any of the techniques of soft lithography. In another embodiment the second modified polydicyclopentadiene is prepared as a preselected pattern on the first modified polydicyclopentadiene using any of the techniques of soft lithography.

The invention will now be illustrated by the following non-limiting examples.

GENERAL EXPERIMENTAL

The following materials were obtained from the designated sources. Grubbs' 2nd generation catalyst and 4-(trifluoromethyl)benzylamine were obtained from Sigma Aldrich. Tris(2-aminoethyl)amine was obtained from Fisher and dicyclopentadiene (>95%) was obtained from Fluka. All materials were used as received with no further purification.

The following instruments and methods were used to analyze materials. SEM images where taken on an Hitachi S3400 SEM in variable pressure mode with a back scattered detector at pressures between 30 and 60 Pa and accelerating voltage of 15 KV. XPS spectra were recorded on an Axis Ultra using a Al kα x-ray source at a 90° take off angle. Samples where placed in the sample exchange chamber until out gassing of any residual solvent or gas had diminished. Survey spectra were recorded at 1 eV intervals with a dwell time of 200 ms. High resolution spectra taken at 0.1 eV intervals with a dwell time of 1000 ms. ATR-IR spectra were recorded on a Brucker Tensor 27 with a liquid nitrogen cooled MCT detector. The samples where mounted on a Harrick GATR accessory. The ATR-IR spectra where taken at a resolution of 4 cm

Example 1

Synthesis of starting polydicyclopentadiene: Dicyclopentadiene (10 mL) heated to 55° C. was mixed with 3.2 mg of 1-3-bis-(2,4,6-trimethylphenyl)-2-imidazolidinylidene)dichloro(phenylmethylene)-(tricyclohexylphosphine)ruthenium dissolved in 100 μL of dichloromethane. This sample was transferred to a glass petri dish and filled to depth of 1-2 mm before being placed in a glass desiccator. The desiccator was placed under vacuum and backfilled with nitrogen three times to remove oxygen. It was then placed in oven at 80° C. for 30 minutes. The starting polydicyclopentadiene was cut into pieces for use in experiments. Thin films, for use in patterning, was cast as a solution prepared as above between two microscope slides and heated on a hot plate until cured. The slides were separated leaving the film behind on one of the slides.

Example 2

Synthesis and characterization of brominated polydicyclopentadiene: Starting polydicyclopentadiene was immersed in 1 M bromine solution in THF for several seconds. Upon removal, the surface was rinsed with copious amounts of acetone. Exposure of starting polydicyclopentadiene for greater than 30 seconds caused the polymer to become dark and crack.

ATR-IR spectroscopy of the brominated polydicyclopentadiene showed a near complete disappearance of the $Csp^2$-H peaks and a smoothing of the $Csp^3$-H peaks. The peak assigned to the C=C bond at 1620 cm-1 in the starting polydicyclopentadiene was nearly absent in the brominated polydicyclopentadiene. This indicates that most of the olefin reacted, but that some of the olefins remained. This is attributed to the starting polydicyclopentadiene being highly cross-linked and hence some olefins would not be accessible for reaction with $Br_2$. The XPS spectra of the brominated polydicyclopentadiene showed mostly C and Br with some oxygen. The ratio of C to Br was approximately 6:1 although the ratio would be 5 to 2 if all of the olefins reacted with $Br_2$ The surface was not completely brominated, but longer exposures to $Br_2$ did not result in a higher C to Br ratio. From the difference between the measured and expected C to Br ratio, it was determined that approximately half of the olefins reacted to yield the expected product. The likely reasons for the low C to Br ratio is that steric crowding around some olefins limited access to them, partial or full oxidation of the olefins with oxygen resulted in fewer olefins to react with $Br_2$, and advantageous water reacting with $Br_2$ and an olefin to form a halohydrin product with one C—Br and one C—OH bond. The ATR-IR spectrum of brominated polydicyclopentadiene demonstrated the presence of an O—H bond, which is consistent with oxidation of the surface or formation of a halohydrin on the surface. Therefore, the yield of bromination of the starting polydicyclopentadiene was approximately 50% as determined by XPS.

Example 3

Synthesis and characterization of amine modified polydicyclopentadiene: A solution of 100 μL of 4-(trifluoromethyl)benzylamine in 10 ml DMF was prepared prior to reaction. The brominated polydicyclopentadiene of Example 2 was immersed into this solution for 4 to 88 hours. The sample was washed with copious amounts of methanol and dried under a stream of nitrogen after removal from the solution.

Analysis of the amine modified polydicyclopentadiene indicated that the 4-(trifluoromethyl)benzylamine was found as a monolayer on the surface rather than in the bulk of the polymer near the surface. The ATR-IR spectra of amine modified polydicyclopentadiene appeared unchanged from brominated polydicyclopentadiene. If all of the alkyl bromides had reacted, the $Csp^2$-H peak would have grown in intensity along with an appearance of an aromatic C=C peak. ATR-IR spectroscopy images the top 100 to 200 nm of a polymeric surface so a large increase in 4-(trifluoromethyl)benzylamine would have resulted in these changes. A second piece of evidence was that the amount of Br in the XPS spectra for amine modified polydicyclopentadiene was similar to that found for the brominated polydicyclopentadiene. XPS is very sensitive to the top several nanometers of a surface; thus, it is an excellent technique for finding surface compositions. This analysis indicated that many of the alkyl bromides in the top ten nanometers did not react.

Another piece of evidence for the location of 4-(trifluoromethyl)benzylamine on the surface is found by measuring the ratio of the peak area, Ap, to the background height, B, measured 30 eV below the peak energy in an XPS spectrum. This method was developed to investigate whether an atom is present only on the surface (Ap/B>30 eV), is uniformly distributed (Ap/B=25 eV), or is localized beneath the surface (Ap/B<20 eV). To test the validity of this method the Br peak in the brominated polydicyclopentadiene was examined. The value for Ap/B was found to be 23.7 eV, which agrees with the prediction that Br is uniformly distributed as expected from the ATR-IR and XPS micrographs. To learn whether the fluorine was found only on the surface, the brominated polydicyclopentadiene was exposed to 4-(trifluoromethyl)benzylamine for 24 h and then studied by XPS. The value for Ap/B was found to be 109.8 eV, which was a high number in this analysis and provided critical evidence that the $CF_3$ group is found only on the surface and is not buried within the polymer. Estimates of surface coverage by XPS indicate a density 1.37 molecules of 4-(trifluoromethyl)benzylamine per $nm^2$ of polymer.

Example 4

Patterning and imaging of modified polydicyclopentadiene: Thin films of brominated polydicyclopentadiene were prepared as described in Example 2. A slab of polydimethylsiloxane (PDMS) patterned in bas-relief to form microfluidic channels was placed on the surface. A solution of 0.5 ml tris(2-aminoethyl)amine in 10 mL of DMF was flown through the microfluidic channels for 16 hours at a flow rate of 500 $\mu L h^{-1}$ with a syringe pump. The channels were flushed with DMF for 1 h before removal of the PDMS. After removal of the PDMS slab and copious washing with organic solvents, the sample was imaged by SEM. To enhance the contrast, the patterned sample was completely immersed into a 1.0 M solution of $CuBr_2$ in methanol for 1 hour followed by washing with water. Cu(II) bonded well to the amine that was patterned on the surface and thus provided a better contrast in the SEM micrographs compared to the micrographs without the copper. Because the entire polymer sample was exposed to $CuBr_2$ but only the monolayer was patterned, any contrast can be attributed to the formation of a monolayer of the amine. SEM micrographs clearly showed that the sample was patterned.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A modified polydicyclopentadiene comprising a starting polydicyclopentadiene having a plurality of double bonds wherein:

(a) a first reactant group independently selected from bromo, chloro and iodo has been added to at least about 2% of the double bond carbons of the starting polydicyclopentadiene; and (b) a second reactant group has displaced some but not all of the first reactant groups;

wherein each second reactant group is independently selected from $-NR_aR_b$, $-OR_c$, $-SR_c$, an amino acid residue, a peptide residue, a nucleic acid residue, a polynucleotide residue and a saccharide residue;

wherein each $R_a$, $R_b$ and $R_c$ is independently H, (C1-10)alkyl, (C2-10)alkenyl, (C2-10)alkynyl, (C1-10)alkanoyl, (C1-10)alkoxy, (C1-10)alkanoyloxy, aryl or (C1-10)alkoxycarbonyl, which (C1-10)alkyl, (C2-10)alkenyl, (C2-10)alkynyl, (C1-10)alkanoyl, (C1-10)alkoxy, (C1-10)alkanoyloxy or (C1-10)alkoxycarbonyl, is optionally substituted with one or more aryl, halo, hydroxy, carboxy, cyano, (C1-10)alkoxy or $N(CH_2CH_2NH_2)_2$ which aryl is optionally substituted with one or more halo, hydroxyl, carboxy, cyano and trifluoromethyl;

or $R_a$ and $R_b$ together with the nitrogen to which they are attached form a pyrrolidine, piperidine, piperazine, morpholino, or thiomorpholino ring; which ring is optionally substituted with one or more (C1-10)alkyl or (C1-10)alkoxy, and which (C1-10)alkyl or (C1-10)alkoxy is optionally substituted with one or more halo.

2. The modified polydicyclopentadiene of claim 1 wherein each second reactant group is independently selected from $NR_aR_b$ wherein each $R_a$ and $R_b$ is independently H, (C1-10)alkyl, (C2-10)alkenyl, (C2-10)alkynyl, (C1-10)alkanoyl, (C1-10)alkoxy, (C1-10)alkanoyloxy, aryl or (C1-10)alkoxycarbonyl, which (C1-10)alkyl, (C2-10)alkenyl, (C2-10)alkynyl, (C1-10)alkanoyl, (C1-10)alkoxy, (C1-10)alkanoyloxy, or (C1-10)alkoxycarbonyl, is optionally substituted with one or more aryl, halo, hydroxy, carboxy, cyano, (C1-10)alkoxy or $N(CH_2CH_2NH_2)_2$ which aryl is optionally substituted with one or more halo, hydroxyl, carboxy, cyano and trifluoromethyl; or $R_a$ and $R_b$ together with the nitrogen to which they are attached form a pyrrolidine, piperidine, piperazine, morpholino, or thiomorpholino ring; which ring is optionally substituted with one or more (C1-10)alkyl or (C1-10)alkoxy, and which (C1-10)alkyl or (C1-10)alkoxy is optionally substituted with one or more halo.

3. The modified polydicyclopentadiene of claim 2 wherein each second reactant group is independently selected from 4-(trifluoromethyl)benzylamine and tris(2-aminoethyl)amine.

4. The modified polydicyclopentadiene of claim 3 wherein each second reactant group is 4-(trifluoromethyl)benzylamine.

5. The modified polydicyclopentadiene of claim 3 wherein each second reactant group is tris(2-aminoethyl)amine.

6. The modified polydicyclopentadiene of claim 1 wherein the first reactant group has been added to at least about 5% of the double bond carbons of the starting polydicyclopentadiene.

7. The modified polydicyclopentadiene of claim 1 wherein the first reactant group has been added to at least about 10% of the double bond carbons of the starting polydicyclopentadiene.

8. The modified polydicyclopentadiene of claim 1 wherein the first reactant group has been added to at least about 90% of the double bond carbons of the starting polydicyclopentadiene.

9. A method for preparing a modified polydicyclopentadiene comprising contacting a first polydicyclopentadiene having a first reactant group selected from bromo, chloro and iodo at about 2% or more of the carbon atoms which carbon atoms correspond to the original double bond carbons of a starting polydicyclopentadiene having a plurality of double bonds, with a reagent that displaces about 2% or more, of the first reactant groups with a second reactant group to form the modified polydicyclopentadiene wherein each second reactant group is independently selected from —$NR_aR_b$, —$OR_c$, an amino acid residue, a peptide residue, a nucleic acid residue, a polynucleotide residue and a saccharide residue;

wherein each $R_a$, $R_b$, and $R_c$ is independently H, (C1-10)alkyl, (C2-10)alkenyl, (C2-10)alkynyl, (C1-10)alkanoyl, (C1-10)alkoxy, (C1-10)alkanoyloxy, aryl or (C1-10)alkoxycarbonyl, which (C1-10)alkyl, (C2-10)alkenyl, (C2-10)alkynyl, (C1-10)alkanoyl, (C1-10)alkoxy, (C1-10)alkanoyloxy or (C1-10)alkoxycarbonyl, is optionally substituted with one or more aryl, halo, hydroxy, carboxy, cyano, (C1-10)alkoxy or $N(CH_2CH_2NH_2)_2$ which aryl is optionally substituted with one or more halo, hydroxyl, carboxy, cyano and trifluoromethyl;

or $R_a$ and $R_b$ together with the nitrogen to which they are attached form a pyrrolidine, piperidine, piperazine, morpholino, or thiomorpholino ring; which ring is optionally substituted with one or more (C1-10)alkyl or (C1-10)alkoxy, and which (C1-10)alkyl or (C1-10)alkoxy is optionally substituted with one or more halo.

10. The method of claim 9 further comprising preparing the starting polydicyclopentadiene by the polymerization of dicyclopentadiene with a catalyst.

11. A method comprising contacting a starting polydicyclopentadiene, which has been prepared by ring-opening metathesis polymerization of dicyclopentadiene and having a plurality of double bonds, with a first reagent that adds a first reactant group independently selected from bromo, chloro and iodo, to at least about 2% of the double bond carbons of the starting polydicyclopentadiene to provide a first modified polydicyclopentadiene; and contacting the first modified polydicyclopentadiene with a second reagent that displaces at least about 2% of the first reactant groups of the first modified polydicyclopentadiene to provide a second modified polydicyclopentadiene.

12. The method of claim 11 wherein the second reactant group displaces at least about 5% of the first reactant groups of the first modified polydicyclopentadiene to provide the second modified polydicyclopentadiene.

13. The method of claim 11 wherein the second reactant group displaces at least about 90% of the first reactant groups of the first modified polydicyclopentadiene to provide the second modified polydicyclopentadiene.

14. The method of claim 11 wherein each second reactant group is independently selected from a group of formula $NR_aR_b$ wherein each $R_a$ and $R_b$ is independently H, (C1-10)alkyl, (C2-10)alkenyl, (C2-10)alkynyl, (C1-10)alkanoyl, (C1-10)alkoxy, (C1-10)alkanoyloxy, aryl or (C1-10)alkoxycarbonyl, which (C1-10)alkyl, (C2-10)alkenyl, (C2-10)alkynyl, (C1-10)alkanoyl, (C1-10)alkoxy, (C1-10)alkanoyloxy, or (C1-10)alkoxycarbonyl, is optionally substituted with one or more aryl, halo, hydroxy, carboxy, cyano, (C1-10)alkoxy or $N(CH_2CH_2NH_2)_2$ which aryl is optionally substituted with one or more halo, hydroxyl, carboxy, cyano and trifluoromethyl; or $R_a$ and $R_b$ together with the nitrogen to which they are attached form a pyrrolidine, piperidine, piperazine, morpholino, or thiomorpholino ring; which ring is optionally substituted with one or more (C1-10)alkyl or (C1-10)alkoxy, and which (C1-10)alkyl or (C1-10)alkoxy is optionally substituted with one or more halo.

15. The method of claim 11 wherein each second reactant group is independently selected from 4-(trifluoromethyl)benzylamine and tris(2-aminoethyl)amine.

16. The modified polydicyclopentadiene of claim 1 wherein the starting polydicyclopentadiene has been prepared by ring-opening metathesis polymerization of dicyclopentadiene.

17. The modified polydicyclopentadiene of claim 1 wherein the starting polydicyclopentadiene has four $sp^2$ hybridized carbons for every ten carbons in the polymer.

18. The method of claim 9 wherein the starting polydicyclopentadiene has been prepared by ring-opening metathesis polymerization of dicyclopentadiene.

19. The method of claim 9 wherein the starting polydicyclopentadiene has four $sp^2$ hybridized carbons for every ten carbons in the polymer.

20. The modified polydicyclopentadiene of claim 1 wherein the first reactant group is bromo.

21. The method of claim 9 wherein the first reactant group is bromo.

22. A modified polydicyclopentadiene comprising a starting polydicyclopentadiene having a plurality of double bonds wherein the starting polydicyclopentadiene is substituted at about 2% or more of the carbon atoms which carbon atoms correspond to the original double bond carbons of a starting polydicyclopentadiene having a plurality of double bonds, with first reactant groups independently selected from bromo, chloro and iodo and second reactant groups independently selected from —$NR_aR_b$, —$OR_c$, —$SR_c$, an amino acid residue, a peptide residue, a nucleic acid residue, a polynucleotide residue and a saccharide residue;

wherein each $R_a$, and $R_b$ and $R_c$ is independently H, (C1-10)alkyl, (C2-10)alkenyl, (C2-10)alkynyl, (C1-10)alkanoyl, (C1-10)alkoxy, (C1-10)alkanoyloxy, aryl or (C1-10)alkoxycarbonyl, which (C1-10)alkyl, (C2-10)alkenyl, (C2-10)alkynyl, (C1-10)alkanoyl, (C1-10)alkoxy, (C1-10)alkanoyloxy or (C1-10)alkoxycarbonyl, is optionally substituted with one or more aryl, halo, hydroxy, carboxy, cyano, (C1-10)alkoxy or $N(CH_2CH_2NH_2)_2$ which aryl is optionally substituted with one or more halo, hydroxyl, carboxy, cyano and trifluoromethyl;

or $R_a$ and $R_b$ together with the nitrogen to which they are attached form a pyrrolidine, piperidine, piperazine, morpholino, or thiomorpholino ring; which ring is optionally substituted with one or more (C1-10)alkyl or (C1-10)alkoxy, and which (C1-10)alkyl or (C1-10)alkoxy is optionally substituted with one or more halo.

23. The modified polydicyclopentadiene of claim 22 wherein the first reactant groups are bromo.

24. The modified polydicyclopentadiene of claim 22 wherein each second reactant group is independently selected from $NR_aR_b$ wherein each $R_a$ and $R_b$ is independently H, (C1-10)alkyl, (C2-10)alkenyl, (C2-10)alkynyl, (C1-10)alkanoyl, (C1-10)alkoxy, (C1-10)alkanoyloxy, aryl or (C1-10)alkoxycarbonyl, which (C1-10)alkyl, (C2-10)alkenyl, (C2-10)alkynyl, (C1-10)alkanoyl, (C1-10)alkoxy, (C1-10)alkanoyloxy, or (C1-10)alkoxycarbonyl, is optionally substituted with one or more aryl, halo, hydroxy, carboxy, cyano, (C1-10)alkoxy or $N(CH_2CH_2NH_2)_2$ which aryl is optionally substituted with one or more halo, hydroxyl, carboxy, cyano and trifluoromethyl; or $R_a$ and $R_b$ together with the nitrogen to which they are attached form a pyrrolidine, piperidine, piperazine, morpholino, or thiomorpholino ring; which ring is optionally substituted with one or more (C1-10)

alkyl or (C1-10)alkoxy, and which (C1-10)alkyl or (C1-10) alkoxy is optionally substituted with one or more halo.

\* \* \* \* \*

UNITED STATES PATENT AND TRADEMARK OFFICE
CERTIFICATE OF CORRECTION

| | | |
|---|---|---|
| PATENT NO. | : 8,981,012 B2 | Page 1 of 1 |
| APPLICATION NO. | : 12/499664 | |
| DATED | : March 17, 2015 | |
| INVENTOR(S) | : Bowden et al. | |

It is certified that error appears in the above-identified patent and that said Letters Patent is hereby corrected as shown below:

In the Claims:

In Claim 9, Column 13, Line 8:

Replace:

–$NR_aR_b$, -$OR_c$

With:

-- –$NR_aR_b$, -$OR_c$, -$SR_c$, --

Signed and Sealed this
Fifth Day of January, 2016

Michelle K. Lee
*Director of the United States Patent and Trademark Office*